(12) United States Patent
Barna

(10) Patent No.: US 8,699,209 B2
(45) Date of Patent: Apr. 15, 2014

(54) EXTERNALLY FUSED ENCLOSURE FOR A SOLAR POWER SYSTEM

(75) Inventor: Kyle Steven Barna, Syracuse, NY (US)

(73) Assignee: Cooper Technologies Company, Houston, TX (US)

( * ) Notice: Subject to any disclaimer, the term of this patent is extended or adjusted under 35 U.S.C. 154(b) by 194 days.

(21) Appl. No.: 13/346,938

(22) Filed: Jan. 10, 2012

(65) Prior Publication Data
US 2013/0176662 A1 Jul. 11, 2013

(51) Int. Cl.
*H02B 1/26* (2006.01)
(52) U.S. Cl.
USPC ............................ 361/601; 361/630; 361/642
(58) Field of Classification Search
USPC .......................................................... 361/601
See application file for complete search history.

(56) References Cited

U.S. PATENT DOCUMENTS

| | | | |
|---|---|---|---|
| 4,102,475 A | 7/1978 | Kalvaitis | |
| 4,881,822 A | 11/1989 | Ridenour | |
| 5,189,256 A | 2/1993 | Epple | |
| 5,335,160 A * | 8/1994 | Savoca | 362/431 |
| 5,370,551 A | 12/1994 | Data | |
| 5,823,378 A | 10/1998 | Evarts et al. | |
| 6,365,826 B1 | 4/2002 | Stendardo et al. | |
| 6,653,562 B2 | 11/2003 | Kochanski et al. | |
| 6,870,089 B1 * | 3/2005 | Gray | 136/251 |
| 6,940,011 B2 | 9/2005 | Koike et al. | |
| 7,253,356 B2 | 8/2007 | Kiyota et al. | |
| 7,785,138 B2 | 8/2010 | Bonnassieux et al. | |
| 7,795,533 B2 | 9/2010 | Bravo et al. | |
| 7,800,889 B2 | 9/2010 | Kato et al. | |
| 7,956,284 B2 | 6/2011 | Bravo et al. | |
| 2004/0115991 A1 * | 6/2004 | Higuchi et al. | 439/621 |
| 2006/0237208 A1 | 10/2006 | Mangold | |
| 2010/0139733 A1 * | 6/2010 | Jonczyk et al. | 136/244 |
| 2010/0218797 A1 | 9/2010 | Coyle, Jr. et al. | |
| 2010/0276173 A1 | 11/2010 | Birkenstock et al. | |
| 2010/0294528 A1 | 11/2010 | Sella et al. | |

* cited by examiner

*Primary Examiner* — Gregory Thompson
(74) *Attorney, Agent, or Firm* — King & Spalding LLP

(57) ABSTRACT

A solar power generation system includes an array of photovoltaic modules, a plurality of positive wire lines leading from the photovoltaic modules, and a junction box including components for receiving the plurality of conductive wire lines from the photovoltaic modules and combining the plurality of conductive wire lines into a smaller number of conductive wire lines leading from the junction box and toward a load. An in-line fuse is connected to each of the positive wire lines leading from the photovoltaic modules. The in-line fuses are positioned proximate but physically outside of the junction box, such that the fuses are accessible without opening the junction box.

20 Claims, 2 Drawing Sheets

EXTERNALLY FUSED ENCLOSURE FOR A SOLAR POWER SYSTEM

TECHNICAL FIELD

The present application relates generally to solar power systems and more particularly to externally fused enclosures, e.g., combines, recombiners, or junction boxes.

BACKGROUND

Photovoltaic power generation systems, often referred to as "solar power systems," are increasing in popularity as a "clean" or "green" energy source, as an alternative to fossil fuels and other energy sources. A photovoltaic power generation system typically includes an array of photovoltaic (PV) cells, referred to as solar cells, connected in series and/or in parallel. Direct current (DC) from the solar cell array is collected at a number of junction boxes, including combiners and/or recombiners at which multiple lead of like polarity are merged together, and then supplied to a DC-to-AC inverter, and further supplied to a load through a power distribution board.

Due to increasing current and voltage requirements for such systems, UL standards now require fuses or breakers in most systems. These fuses are typically provided in the combiner and/or recombiner boxes, with separate fuses connected to the incoming positive lead from each PV module, and in some cases additional fuses connected to incoming negative leads from each PV module. UL standards specify minimum space requirements for each type of conductor in a solar junction box, including a minimum "bend space" requirement for each type of conductor, to allow sufficient room for ergonomic access by a technician, e.g., for servicing components in the box. For example, UL standards specify a minimum bend space requirement for fuses located in a solar junction box.

Solar system fuses typically have relatively high resistance values, and can thus generate substantial amounts of heat. As a result, the load capacity for solar junction boxes may be limited (e.g., by UL code requirements) to reduce the risk of arcing and/or fire in the boxes. In some systems, the junctions box load capacity acts as a capacity bottleneck for the system. Thus, the heat-generating fuses may limit the load capacity for the entire solar power system.

SUMMARY

In one aspect of the invention, a solar power generation system includes an array of photovoltaic modules, a plurality of positive wire lines leading from the photovoltaic modules, and a junction box including components for receiving the plurality of conductive wire lines from the photovoltaic modules and combining the plurality of conductive wire lines into a smaller number of conductive wire lines leading from the junction box and toward a load. An in-line fuse is connected to each of the positive wire lines leading from the photovoltaic modules. The in-line fuses are positioned proximate but physically outside of the junction box, such that the fuses are accessible without opening the junction box.

In another aspect of the invention, an externally-fused combiner arrangement for a solar power generation system includes a combiner box including components for receiving a plurality of positive wire lines from an array of photovoltaic modules and combining the plurality of positive wire lines into a smaller number of conductive wire lines leading from the combiner box and toward a load; and a plurality of in-line fuses, each connected in-line to one of the positive wire lines received at the combiner box. The in-line fuses are positioned proximate but physically outside of the combiner box, such that the fuses are accessible without opening the junction box.

In another aspect of the invention, a method for replacing or servicing a fuse in a solar power generation system includes (a) accessing a combiner arrangement including a combiner box including components for receiving a plurality of positive wire lines from an array of photovoltaic modules and combining the plurality of positive wire lines into a smaller number of conductive wire lines leading from the combiner box and toward a load, and a plurality of in-line fuses, each connected in-line to one of the positive wire lines received at the combiner box, the plurality of in-line fuses being positioned proximate but physically outside of the combiner box; and (b) servicing at least one of the in-line fuses without opening the junction box.

DETAILED DESCRIPTION OF EXEMPLARY EMBODIMENTS

Figure 1:
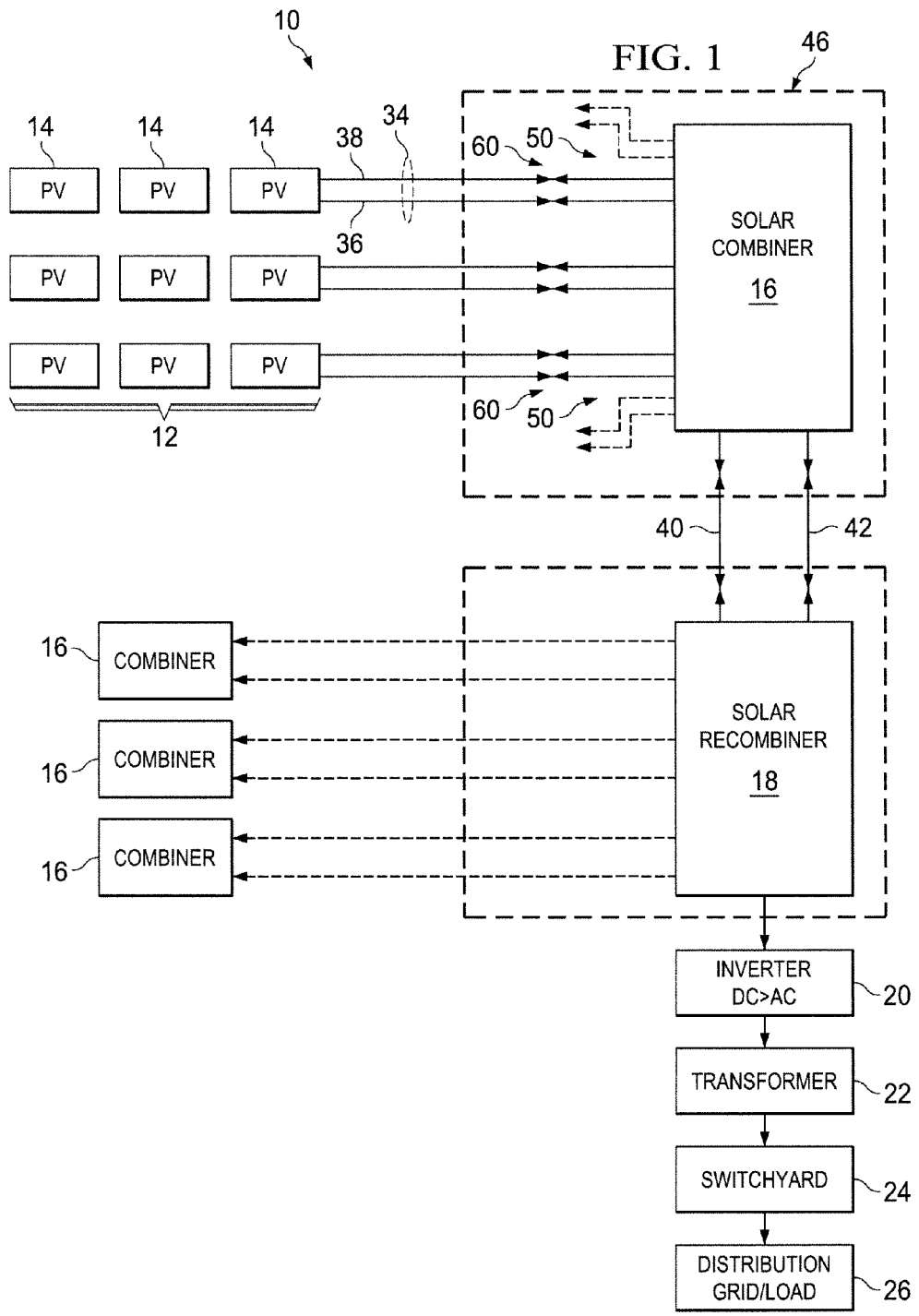
FIG. 1 illustrates an example solar power generation system 10 having externally-fused junction boxes (e.g., combiner and or recombiner boxes), according to some embodiments of the present invention.

The invention may be better understood by reading the following description of non-limitative, exemplary embodiments with reference to the attached drawings wherein like parts of each of the figures are identified by the same reference characters.

The invention relates to solar power generation systems that include junction boxes in which fuses are located near, but physically outside of, the junction boxes, as compared to typical systems in which the fuses are housed within the junction boxes. In some embodiments of the present invention, in-line fuses may be provided in terminated wire harnesses configured for easy connection to the exterior of a respective junction box.

FIG. 1 illustrates an example solar power generation system 10 having externally-fused junction boxes (e.g., combiner and or recombiner boxes), according to some embodiments. System 10 may include one or more photovoltaic (PV) arrays 12, one or more solar combiners 14, a solar recombiner 18, an inverter 20, a transformer 22, and a switchyard 24, which delivers power to a distribution grip (e.g., via transmission lines) or other power load 26.

In the illustrated embodiment, system 10 may includes multiple combiners 14 connected to a solar recombiner 18, wherein each combiner 16 is connected to a corresponding PV array 12. Other embodiments may include only a single PV array 12 with a single combiner 16 connected to the inverter 20, such that the recombiner 18 may be omitted from the system. Other embodiments of system 10 may have any other suitable number of PV arrays 12, combiners 14, and/or recombiners 16 arranged in any known manner.

Each PV array 12 includes an assembly of PV modules 14 linked an any known manner. Each PV module 14 of array 14 may be connected to combiner 16 by a wire pair 34 including a positive wire line 36 and negative wire line 38. Wire lines 36 and 38 may include any type or types of electrical conductor. For example, as discussed below, each wire lines 36 and 38 may include a first length extending from array 12 to a location close to combiner 16, and a second length provided by a terminated wire harness 50 connected externally to combiner 16.

Combiner 16 may comprise a box or enclosure (a junction box) including components for receiving the multiple positive and negative wire lines 36 and 38 from the PV array 12 and combining the multiple positive and negative wire lines 36 and 38 into a smaller number of output lines 40 and 42 leading to recombiner 18 (or in embodiments without a recombiner, to inverter 20). For example, combiner 16 may combine all of the positive wire lines 36 from array 12 into a single positive output wire line 40, and all of the negative wire lines 38 from array 12 into a single negative output wire line 42. Combiner 16 may multi-line power distribution blocks for performing the actual combination of the wire lines, as well as additional components required or typical for a combiner box, e.g., a disconnect switch and a circuit protection system (e.g., surge protection) housed in the junction box.

Typical combiners also include fuses for the positive and/or negative wire lines, located inside the box, e.g., as required by UL code. However, unlike typical combiners, in the present invention the fuses 60 are located physically outside of the combiner box. For example, as discussed below, each fuse 60 may be an in-line fuse provided in a terminated wire harness 50 connected externally to combiner box 16. Providing the fuses as in-line fuses external to the combiner box may provide numerous advantages compared to known systems. With reference to FIG. 1, combiner box 14 and the externally-located fuses 60 are referred to together as an externally-fused combiner arrangement 46. Details of an example externally-fused combiner arrangement 46, including details and advantages of the fuse arrangement, are discussed in greater detail below with reference to FIG. 2.

Similar to each combiner 16, recombiner 18 may combine the wire lines from multiple combiners 16 into a smaller number of lines for delivery of power to the downstream components (inverter 20, transformer 22, and switchyard 24), for ultimate delivery to the distribution grid/load 26. For example, as shown in FIG. 1, positive and negative output wire lines 40 and 42 from each combiner 16 may be connected to, and combined at, recombiner 18. Thus, recombiner 18 may include at least some similar components as combiner 16. Further, in some embodiments, recombiner 18 may be externally-fused, similar to combiner 16. In other embodiments, recombiner 18 may have a known, internally-fused configuration.

Inverter 20 may be configured to convert the variable DC output of PV modules 14 (received from recombiner 18) into a utility frequency AC current that can be fed into the commercial electrical grid or used by a local, off-grid electrical network, for example. Inverter 20 may provide special functions adapted for use with PV arrays, e.g., maximum power point tracking and anti-islanding protection, for example.

Figure 2:
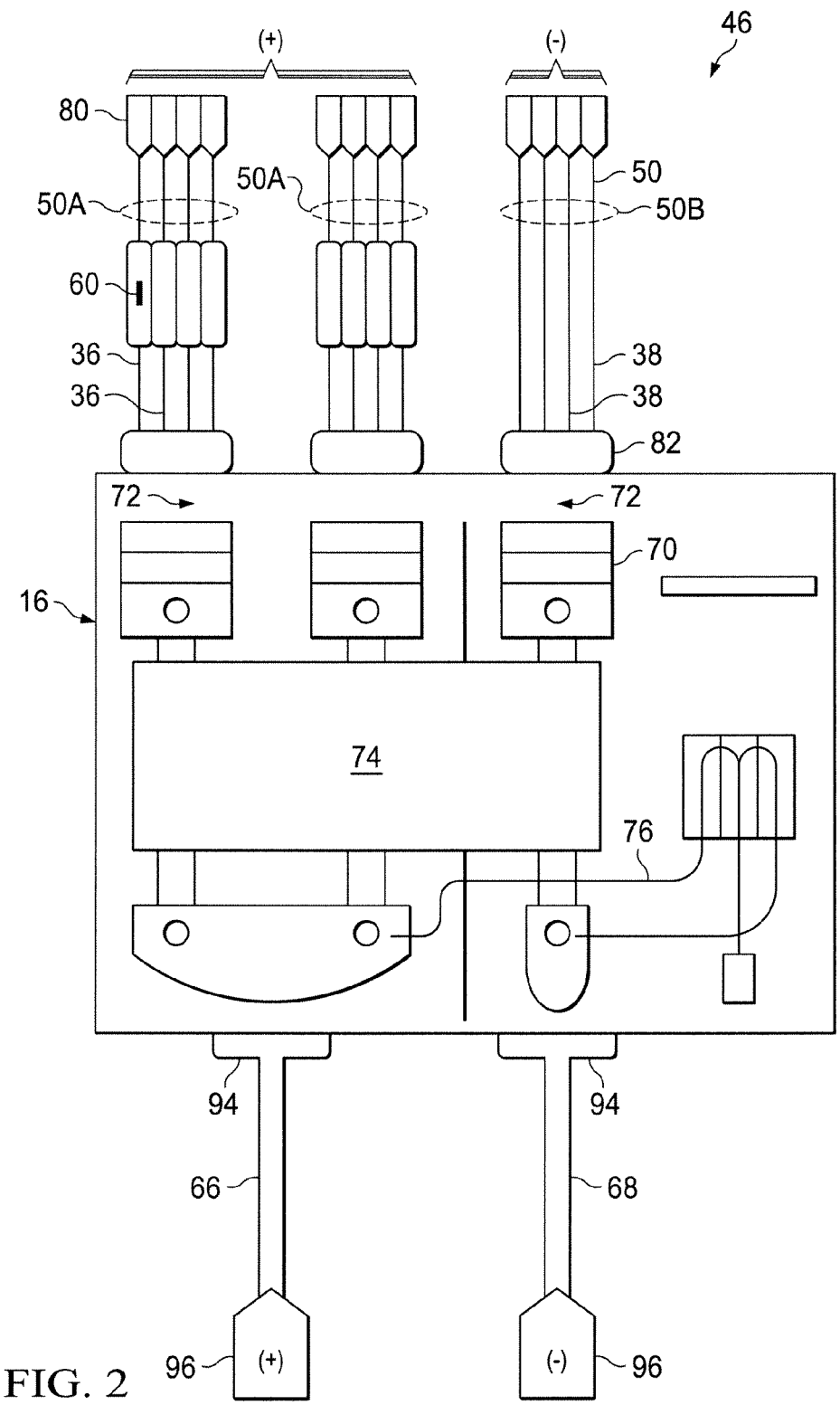
FIG. 2 illustrates an example externally-fused combiner arrangement for use in the system of FIG. 1, according to certain embodiments of the present invention.

FIG. 2 illustrates details of an example externally-fused combiner arrangement 46 for use in system 10 shown in FIG. 1, according to certain embodiments of the present invention. Externally-fused combiner arrangement 46 includes the combiner junction box 16, wire harnesses 50 for receiving positive and negative wire lines 36 and 38 from PV modules 14, and output connections 66 and 68 for positive and negative output wire lines 40 and 42.

Combiner box 16 houses multi-line power distribution blocks 70, external connection interfaces 72, a disconnect switch 74, and a circuit protection (surge protection) system 76. Multi-line power distribution blocks 70 are configured to perform the actual combination of the incoming wire lines. External connection interfaces 72 provide a releasable connection point for wire harnesses 50. Disconnect switch 74 may comprise a 3-pole disconnect switch, and may be configured for manual and/or automatic activation. Circuit protection system 76 may comprise any suitable surge protection system, e.g., including a common ground connected to a backplate of box 16, a ground lug, or any other suitable configuration. Combiner box 16 may include any other suitable components known to one of ordinary skill in the art, e.g., systems or sensors for monitoring the current, temperature, or other aspects of combiner 16.

Output connections 66 and 68 may include manual connectors 94 at one end (e.g., which may be similar to connectors 82 of harnesses 50) and output plugs or receptacles 96 for connection to positive and negative output wire lines 40 and 42 at the other end.

As mentioned above, terminated wire harnesses 50 provide a length of positive and negative wire lines 36 and 38 from PV modules 14. Wire harnesses 50 may providing a grouping of wire lines for easy connection/disconnection to external connection interfaces 72 of combiner box 16, and may include in-line fuses on each wire line of the respective harness 50. Wire harnesses 50 may include positive wire harnesses 50A for grouping the ends of positive wire lines 36 and negative wire harnesses 50B for grouping the ends of negative wire lines 38.

As shown, each wire harness 50 may include wire line connectors 80 at one end of the harness, each connector 80 configured for connection to a length of one of the positive wire lines 36 leading back to a PV module 14, and including any suitable male or female connectors. A manual connector 82 is provided at another end of the harness 50, the manual connector 82 configured to releasably connect to a corresponding external connection interface 72 of the combiner box 16. Manual connector 82 may a conduit fitting or a cord grip, or any other connector for providing relatively easy manual connection and disconnection of the harness 50 from combiner box 16. Manual connectors 82 thus allow easy manual connection and disconnection of a group of wire lines.

A length of positive or negative wire line 36 or 38 is connected between the wire line connectors 80 and the manual connector 82 of the respective harness 50. Thus, a length of each positive wire line 36 is connected between connectors 80 and 82 of positive harness 50A, and similarly a length of each negative wire line 38 is connected between connectors 80 and 82 of positive harness 50B.

As shown, in-line fuses 60 may be connected on each positive wire line 36 of positive harnesses 50A. Thus, fuses 60 are connected near, but physically outside, combiner box 16. In some embodiments, in-line fuses 60 may also be connected on each negative wire line 38 of negative harnesses 50B. Fuses 60 may be any suitable type of fuses known by those of skill in the art. In some embodiments, fuses 60 may be rainproof or watertight, as they may be exposed to the outside environment. For example, fuses 60 may be a Cooper Bussmann in-line fuse 30 A, 1000Vdc.

Arranging fuses 60 external to combiner box 16 may provide a number of advantages over the known arrangements. For example, removing the fuses from the combiner box removes a major source of heat from the box, which may allow for increased electrical ratings (e.g., UL rating) of the combiner, thus raising the allowed load capacity for the combiner. For example, the externally-fused combiner box may be rated at 90° C., as compared to typical solar junction boxes having internal fuses, typically rated at 75° C. Such increase may alleviate the bottleneck in the system, thereby allowing for greater load capacity.

As another example, locating the fuses externally from the combiner box may reduce the minimum dimensions of the box, as compared to typical solar junction boxes having internal fuses. UL standards specify minimum space requirements for each type of conductor in a solar junction box, including a minimum "bend space" requirement for each type of conductor, to allow sufficient room for ergonomic access by a technician, e.g., for servicing components in the box. For example, UL standards specify a minimum bend space requirement for fuses located in a solar junction box. Thus, in the present invention, the minimum spacing requirements (e.g., bend space requirements) for the fuses are avoided, thus reducing the minimum overall dimensions of the box, which may be advantageous.

As another example, the externally located fuses are accessible and serviceable (e.g., for replacement or repair) by a technician without opening the junction box, which may be advantageous, e.g., by reducing servicing time and complexity, and by eliminating injury risks associating with working inside the junction box.

As another example, the configuration of the present invention may provide fewer points that may require service, and may require less frequent servicing. For example, in typical known systems, point of connection for fuses inside the junction box may become loosened due to torque, vibration, etc. For example, internal fuses may require servicing about every 6 months. The configuration of the present invention may reduce or substantially eliminate these points of service, and thus may reduce or substantially eliminate the required servicing of such points.

As another example, the configuration of the present invention allows a technician to access (e.g., to service or disconnect) individual fuses without opening the junction box, and also to access (e.g., to service or disconnect) all fuses for the PV array 12 at a single location (as compared to systems in which the fuses are spaced apart in the PV array field).

Therefore, the present invention is well adapted to attain the ends and advantages mentioned, as well as those that are inherent therein. The particular embodiments disclosed herein are illustrative only, as the invention may be modified and practiced in different but equivalent manners apparent to those having ordinary skill in the art and having the benefit of the teachings herein. While numerous changes may be made by those having ordinary skill in the art, such changes are encompassed within the spirit and scope of this invention as defined by the appended claims. Furthermore, no limitations are intended to the details of construction or design herein shown. It is therefore evident that the particular illustrative embodiments disclosed above may be altered or modified and all such variations are considered within the scope and spirit of the present invention.

What is claimed is:

1. A solar power generation system, comprising:
   an array of photovoltaic modules;
   a first plurality of positive wire lines electrically coupled to the array of photovoltaic modules;
   a plurality of in-line fuses having a first end and a second end, wherein the first end of each of the plurality of in-line fuses is electrically coupled to one of the first plurality of positive wire lines;
   a second plurality of positive wire lines, wherein each of the plurality of positive wire lines is electrically coupled to the second end of each of the plurality of in-line fuses; and
   a junction box including a plurality of components for receiving each of the second plurality of positive wire lines and combining the second plurality of positive wire lines into at least one third positive wire line leading from the junction box and toward a load,
   wherein the plurality of in-line fuses are positioned proximate but physically outside of the junction box, such that the plurality of in-line fuses is accessible without opening the junction box.

2. The system according to claim 1, wherein the plurality of components of the junction box comprises a plurality of external connection interfaces external to the junction box, wherein the second plurality of positive wire lines are connected to the plurality of external connection interfaces, wherein the plurality of external connection interfaces are configured to allow connection and disconnection of the second plurality of positive wire lines without opening the junction box.

3. The system according to claim 1, wherein the first plurality of positive wire lines, the plurality of in-line fuses, and the second plurality of positive wire lines comprise at least one wire harness, wherein each of the at least one wire harness comprises a first plurality of connectors and at least one second connector, wherein the first plurality of connectors electrically couples to the first plurality of positive wire lines and to the array of photovoltaic modules, and wherein the at least one second connector electrically couples to the second plurality of positive wire lines and to at least one of the plurality of components.

4. The system according to claim 3, wherein the at least one second connector of the at least one wire harness is configured for releasable connection to an external connection interface of the junction box, wherein the external connection interface is electrically coupled to a power distribution block housed inside the junction box.

5. The system according to claim 1, further comprising:
   a first plurality of negative wire lines electrically coupled to the photovoltaic modules;
   a plurality of additional in-line fuses having a third end and a fourth end, wherein the third end of each of the plurality of additional in-line fuses is electrically coupled to one of the first plurality of negative wire lines;
   a second plurality of negative wire lines, wherein each of the plurality of negative wire lines is electrically coupled to the fourth end of each of the plurality of additional in-line fuses; and to the plurality of components of the junction box,
   wherein the plurality of additional in-line fuses are positioned proximate but physically outside of the junction box, such that the plurality of additional in-line fuses is accessible without opening the junction box.

6. The system according to claim 1, wherein the plurality of components of the junction box comprises a disconnect switch and a surge protector housed in the junction box, wherein the disconnect switch and the surge protector are electrically coupled in series with the second plurality of positive wire lines.

7. The system according to claim 1, wherein the junction box is a combiner or a recombiner.

8. The system according to claim 1, wherein:
   the junction box is a combiner; and
   the system further comprises a DC-to-AC inverter downstream of the combiner.

9. The system according to claim 1, wherein:
   the junction box is a combiner; and the system further comprises a recombiner downstream of the combiner, and a DC-to-AC inverter downstream of the recombiner.

10. The system according to claim 1, wherein each of the plurality of in-line fuses is replaceable or serviceable without opening the junction box.

11. The system according to claim 1, wherein each individual positive wire line of the second plurality of positive wire lines can be electrically disconnected from the junction box by manually disconnecting the corresponding in-line fuse of the plurality of in-line fuses without opening the junction box.

12. An externally-fused combiner arrangement for a solar power generation system, comprising:
a first plurality of positive wire lines electrically coupled to an array of photovoltaic modules;
a plurality of in-line fuses having a first end and a second end, wherein the first end of each of the plurality of in-line fuses is electrically coupled to one of the first plurality of positive wire lines;
a second plurality of positive wire lines, wherein each of the plurality of positive wire lines is electrically coupled to the second end of each of the plurality of in-line fuses; and
a combiner box including a plurality of components for receiving each of the second plurality of positive wire lines and combining the second plurality of positive wire lines into at least one third positive wire line leading from the combiner box and toward a load,
wherein the plurality of in-line fuses are positioned proximate but physically outside of the combiner box, such that the plurality of in-line fuses is accessible without opening the combiner box.

13. The externally-fused combiner arrangement according to claim 12, wherein the plurality of components of the combiner box comprises a plurality of external connection interfaces external to the junction box, wherein the second plurality of positive wire lines are connected to the plurality of external connection interfaces, wherein the plurality of external connection interfaces are configured to allow for releasable manual connection of the second plurality of positive wire lines without opening the junction box.

14. The externally-fused combiner arrangement according to claim 12, wherein the first plurality of positive wire lines, the plurality of in-line fuses, and the second plurality of positive wire lines comprise at least one wire harness, wherein each of the at least one wire harness comprises a first plurality of connectors and at least one second connector, wherein the first plurality of connectors electrically couples to the first plurality of positive wire lines and to the array of photovoltaic modules, and wherein the at least one second connector electrically couples to the second plurality of positive wire lines and to at least one of the plurality of components.

15. The externally-fused combiner arrangement according to claim 14, wherein the at least one second connector of the at least one wire harness is configured for releasable connection to an external connection interface of the combiner box, wherein the external connection interface is electrically coupled to a power distribution block housed inside the combiner box.

16. The externally-fused combiner arrangement according to claim 12, wherein the plurality of components of the combiner box comprises a disconnect switch and a surge protector housed in the combiner box, wherein the disconnect switch and the surge protector are electrically coupled in series with the second plurality of positive wire lines.

17. The externally-fused combiner arrangement according to claim 12, wherein the combiner box comprises a recombiner box, and wherein the second plurality of positive wire lines are received from a plurality of combiner boxes upstream of the recombiner box.

18. The externally-fused combiner arrangement according to claim 12, wherein each individual positive wire line of the second plurality of positive wire lines can be electrically disconnected from the combiner box by manually disconnecting the corresponding in-line fuse of the plurality of in-line fuses without opening the junction box.

19. A method for replacing or servicing a fuse in a solar power generation system, comprising:
accessing a combiner arrangement, wherein the combiner arrangement comprises:
a first plurality of positive wire lines electrically coupled to an array of photovoltaic modules;
a plurality of in-line fuses having a first end and a second end, wherein the first end of each of the plurality of in-line fuses is electrically coupled to one of the first plurality of positive wire lines;
a second plurality of positive wire lines, wherein each of the plurality of positive wire lines is electrically coupled to the second end of each of the plurality of in-line fuses; and
a combiner box including a plurality of components for receiving each of the second plurality of positive wire lines and combining the second plurality of positive wire lines into at least one third positive wire line leading from the combiner box and toward a load, wherein the plurality of in-line fuses are positioned proximate but physically outside of the combiner box; and
servicing at least one of the plurality of in-line fuses without opening the combiner box.

20. The system according to claim 1, further comprising:
a plurality of negative wire lines electrically coupled to the array of photovoltaic modules and to the plurality of components of the junction box.

* * * * *